(12) United States Patent
Kamioka (10) Patent No.: US 9,327,797 B2
(45) Date of Patent: May 3, 2016

(54) VEHICLE SHOCK ABSORBER (71) Applicant: YAMAHA HATSUDOKI KABUSHIKI KAISHA, Iwata-shi, Shizuoka (JP)

(72) Inventor: Takamasa Kamioka, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 190 days.

(21) Appl. No.: 14/349,125

(22) PCT Filed: Oct. 4, 2012

(86) PCT No.: PCT/JP2012/075856
§ 371 (c)(1),
(2) Date: Apr. 2, 2014

(87) PCT Pub. No.: WO2013/051671
PCT Pub. Date: Apr. 11, 2013

(65) Prior Publication Data
US 2014/0252706 A1    Sep. 11, 2014

(30) Foreign Application Priority Data
Oct. 4, 2011    (JP) ................. 2011-220150

(51) Int. Cl.
*B62K 25/08*    (2006.01)
*F16F 9/36*    (2006.01)
(Continued)

(52) U.S. Cl.
CPC .............. *B62K 25/08* (2013.01); *B60G 15/061* (2013.01); *F16F 9/366* (2013.01); *B62K 2025/048* (2013.01)

(58) Field of Classification Search
CPC ........ B60G 15/061; B62K 25/08; F16F 9/366
See application file for complete search history.

(56) References Cited

U.S. PATENT DOCUMENTS

| 2002/0046651 | A1 | 4/2002 | Casellas et al. |
| 2008/0258420 | A1 | 10/2008 | Fuse et al. |
| 2010/0236882 | A1* | 9/2010 | Uchiyama .............. B62K 25/08 188/322.15 |

FOREIGN PATENT DOCUMENTS

| EP | 2 233 777 A1 | 9/2010 |
| JP | 61-85736 U | 6/1986 |

(Continued)

OTHER PUBLICATIONS

Official Communication issued in corresponding European Patent Application No. 12838406.2, mailed on Oct. 15, 2015.

(Continued)

*Primary Examiner* — Vishal Sahni
(74) *Attorney, Agent, or Firm* — Keating and Bennett, LLP (57) ABSTRACT A guide member for a vehicle shock absorber having a construction with which, even when the guide member contacts an inside tube member, the operation of the vehicle shock absorber is not obstructed. A vehicle shock absorber system is provided with an outer tube, an inner tube, a damper cylinder which is connected to the outer tube and is positioned on the inside of the inner tube, a spring guide which is fixed onto the outer circumferential surface of the damper cylinder, and a coil spring which is positioned between the inner tube and the spring guide. The spring guide is provided with a guide main body portion and a low friction portion provided in a portion of the guide main body portion which contacts the inner tube when the outer tube and/or the inner tube has been bent. The low friction portion has a lower coefficient of friction than the guide main body portion.

8 Claims, 8 Drawing Sheets (51) Int. Cl.
  *B60G 15/06* (2006.01)
  *B62K 25/04* (2006.01)

(56) References Cited

FOREIGN PATENT DOCUMENTS

| JP | 63-280941 A | 11/1988 |
| JP | 2002-527692 A | 8/2002 |
| JP | 2003-148546 A | 5/2003 |
| JP | 2009-156419 A | 7/2009 |
| JP | 2010-084922 A | 4/2010 |
| JP | 2010-261477 A | 11/2010 |

OTHER PUBLICATIONS

Official Communication issued in International Patent Application No. PCT/JP2012/075856, mailed on Dec. 18, 2012.

* cited by examiner

VEHICLE SHOCK ABSORBER

BACKGROUND OF THE INVENTION

1. Field of the Invention

The present invention relates to a vehicle shock absorber in which a damper is housed in a space defined by an outer tube member and an inner tube member.

2. Description of the Related Art

There is a known vehicle shock absorber in which a damper is housed in a space defined by an outer tube member and an inner tube member that is disposed to the inside of the outer tube member and so as to be capable of relative movement in the tube axial direction. With this vehicle shock absorber, as disclosed in Japanese Laid-Open Patent Application 2003-148546, for example, an inner tube member is disposed to the inside of an outer tube member and so as to be capable of relative movement in the axial direction, and a coil spring is disposed between the outer tube member and the inner tube member. The interior space defined by the outer tube member and inner tube member is sealed. This allows any impacts that the vehicle receives from the road surface to be absorbed by an air spring within the internal space and the coil spring.

With the above-mentioned vehicle shock absorber, a damper is provided in the internal space defined by the outer tube member and inner tube member. The damper includes a damper cylinder that is connected to the outer tube member and is filled with oil, and a piston rod that is connected to the inner tube member and includes at its distal end portion a piston that moves relatively within the damper cylinder. With this configuration, when the piston moves within the damper cylinder along with the relative movement of the outer tube member and inner tube member, a damping force is produced by oil flowing through a port provided in the piston.

When the vehicle shock absorber disclosed in Japanese Laid-Open Patent Application 2003-148546 is used for the front fork of a motorcycle or the like, however, depending on how the motorcycle is being ridden, the vehicle shock absorber may not operate smoothly. Specifically, the vehicle shock absorber will operate normally as long as the motorcycle is being ridden normally over a road, but when the motorcycle is being ridden in a way that puts a great deal of stress on it, such as when the motorcycle is jumped and then makes a landing, the resistance inside the vehicle shock absorber may be so high that the vehicle shock absorber does not operate smoothly. One possible cause of this is that the guide member in the vehicle shock absorber comes into contact with the inner tube member.

SUMMARY OF THE INVENTION

Accordingly, preferred embodiments of the present invention provide a guide member configured such that operation of a vehicle shock absorber is not impaired even if the guide member in the vehicle shock absorber comes into contact with an inner tube member.

The vehicle shock absorber according to a preferred embodiment of the present invention includes an outer tube member connected to a vehicle body, an inner tube member connected to a wheel and disposed on an inside of the outer tube member so as to be capable of relative movement in an axial direction of the outer tube member, a damper cylinder connected to the outer tube member and disposed on an inside of the inner tube member, a guide member fixed to a portion of an outer peripheral surface of the damper cylinder that is opposite to the inner tube member, and a spring member disposed between the inner tube member and the guide member and arranged to expand and contract along with the relative movement of the outer tube member and the inner tube member. The guide member includes a guide main body and a low-friction component provided at a portion of the guide main body that comes into contact with the inner tube member when the outer tube member and/or the inner tube member is bent. The low-friction component has a coefficient of friction lower than that of the guide main body.

With the vehicle shock absorber according to a preferred embodiment of the present invention, an increase in the coefficient of friction at the contact portion is prevented even when the guide member fixed to the outer peripheral surface of the damper cylinder has come into contact with the inner tube member. This prevents the operation of the vehicle shock absorber from being impaired.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

As mentioned above, when a vehicle shock absorber is used in the front fork of a motorcycle, for example, the vehicle shock absorber will operate normally as long as the motorcycle is being ridden on a normal road surface. However, when the motorcycle is being ridden in a way that puts a great deal of stress on it, such as when the motorcycle is jumped and then makes a landing, the resistance inside the vehicle shock absorber may be so high that the vehicle shock absorber does not operate smoothly.

In regard to this phenomenon, the inventors of the present application discovered that if a vehicle shock absorber used in the front fork of a motorcycle was subjected to a heavy impact such as landing after a jump, a large bending moment would occur in the outer tube member and/or the inner tube member of the vehicle shock absorber. Furthermore, the inventors of the present invention discovered that if a vehicle shock absorber was subjected to a large bending moment, the guide member attached to the outer peripheral surface of the damper cylinder would be strongly pressed against the inner tube member within the vehicle shock absorber, so the operation of the vehicle shock absorber would be hampered.

To solve the above problems, the inventors of the present invention discovered and invented the configurations described in the various preferred embodiments below. These preferred embodiments will now be described with reference to the drawings. However, the dimensions of the constituent members in the drawings do not faithfully represent the actual dimensions of the constituent members, the actual dimensional proportions of the constituent members, etc.

In the following description, the terms "in front," "to the rear," "to the left," and "to the right" mean in front, to the rear, to the left, and to the right as seen by the operator seated on a seat 9 of a motorcycle 1 while holding a handlebar 8.

Preferred Embodiment 1

Figure 1:
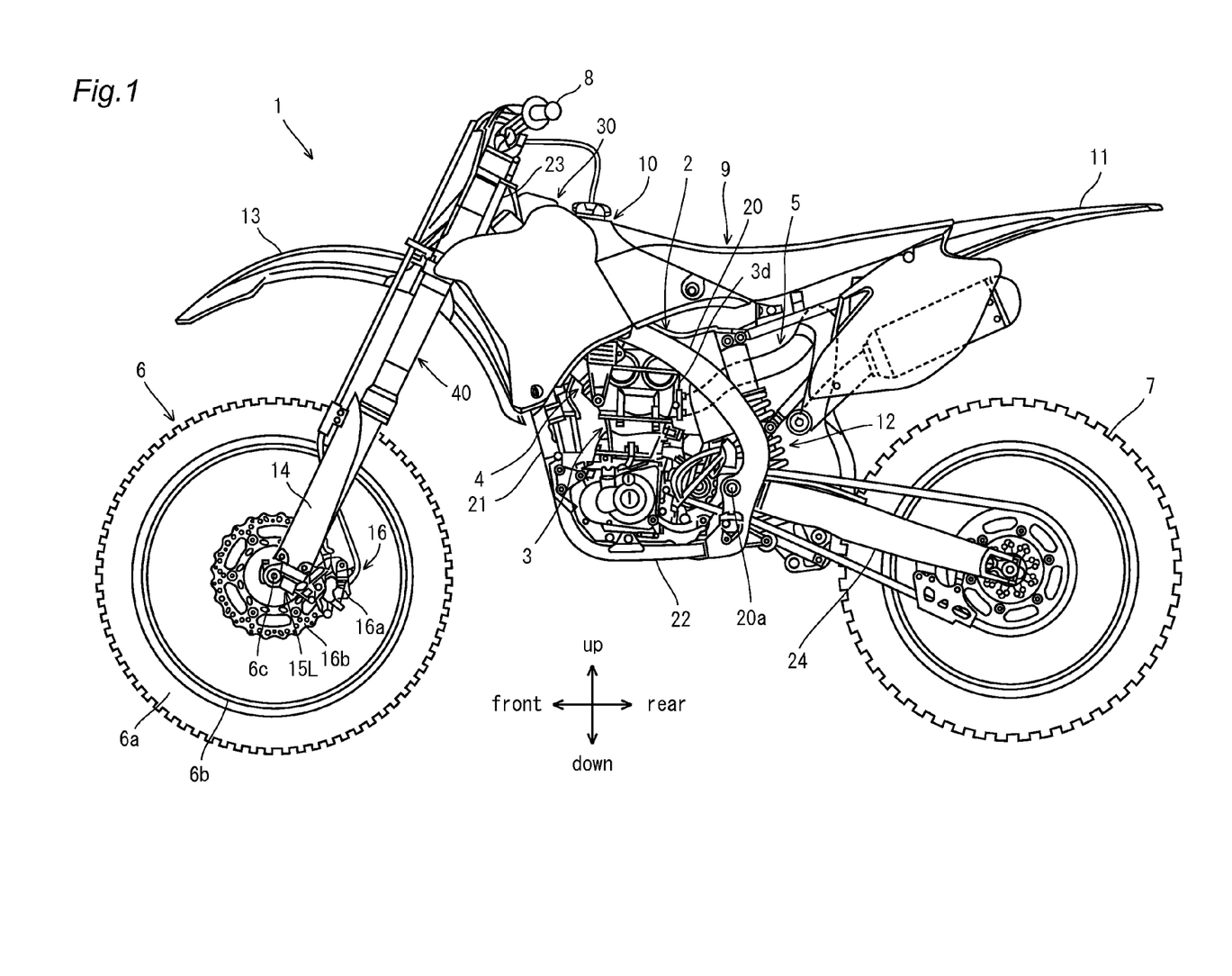
FIG. 1 is a simplified left side view of the configuration of a motorcycle pertaining to Preferred Embodiment 1 of the present invention.

FIG. 1 is the simplified configuration of the motorcycle 1 according to Preferred Embodiment 1. FIG. 1 shows a left-side view of the motorcycle 1. The motorcycle 1 is, for example, a motocross bike used for riding over irregular terrain. The motorcycle 1 includes a cradle-type body frame 2 (vehicle body), an engine 3, an intake apparatus 4, an exhaust apparatus 5, a front wheel 6 (wheel), a rear wheel 7, a handlebar 8, a seat 9, and a fuel tank 10.

The body frame 2 includes a pair of main frames 20, a pair of down frames 21, a lower frame 22, a head pipe 23, and a rear arm 24. As shown in FIG. 1, the head pipe 23 is disposed at the front of the motorcycle 1. The main frames 20 extend diagonally downward from the head pipe 23 and toward the rear. The down frames 21 extend toward the rear and downward from the head pipe 23. The lower frame 22 connects the lower ends of the down frames 21 to the lower ends of the main frames 20.

An air cleaner 30 is disposed to the rear of the head pipe 23. The fuel tank 10 is disposed to the rear of the air cleaner 30 and above the main frames 20. The front portion of the seat 9 is disposed above the fuel tank 10. The seat 9 extends to the rear from the fuel tank 10.

The engine 3 is disposed to the rear of the down frames 21 and below the main frames 20. A pivot shaft 20a is provided at the rear portion of the main frames 20. The front end portion of the rear arm 24 is supported by the pivot shaft 20a so as to be able to pivot up and down. The rear wheel 7 is rotatably attached to the rear end portion of the rear arm 24. A rear fender 11 is disposed above the rear wheel 7. A rear suspension 12 is disposed between the engine 3 and the rear wheel 7.

The handlebar 8 is rotatably connected on the upper side of a steering shaft 25 disposed within the head pipe 23. A front fork 40 (vehicle shock absorbers) is aligned with the steering shaft 25 (see FIG. 2). The front wheel 6 is rotatably attached to the lower end of the front fork 40. A front fender 13 is disposed above the front wheel 6. Fork covers 14 are attached to the lower portion of the front fork 40. The fork covers 14 protect the front fork 40 from flying stones, etc.

The front fork 40 is disposed to flank the front wheel 6 on the left and right. The portion of the front fork 40 disposed on the left side of the front wheel 6 includes an axle bracket 15L at its lower end (see FIGS. 1 and 2). The portion of the front fork 40 disposed on the right side of the front wheel 6 includes an axle bracket 15R at its lower end (see FIG. 2). As shown in FIG. 1, the front wheel 6 includes a tire 6a, a front rim 6b, and an axle 6c. The axle brackets 15L and 15R support the axle 6c.

As shown in FIG. 1, a brake apparatus 16 is disposed on the front wheel 6. The brake apparatus 16 includes a brake caliper 16a and a brake disk 16b. The brake disk 16b is preferably a circular disk, and is preferably disposed on the left side of the front wheel 6, coaxially with the front wheel 6. The brake caliper 16a is attached to the rear end of the axle bracket 15L disposed on the left side of the front wheel 6.

Figure 2:
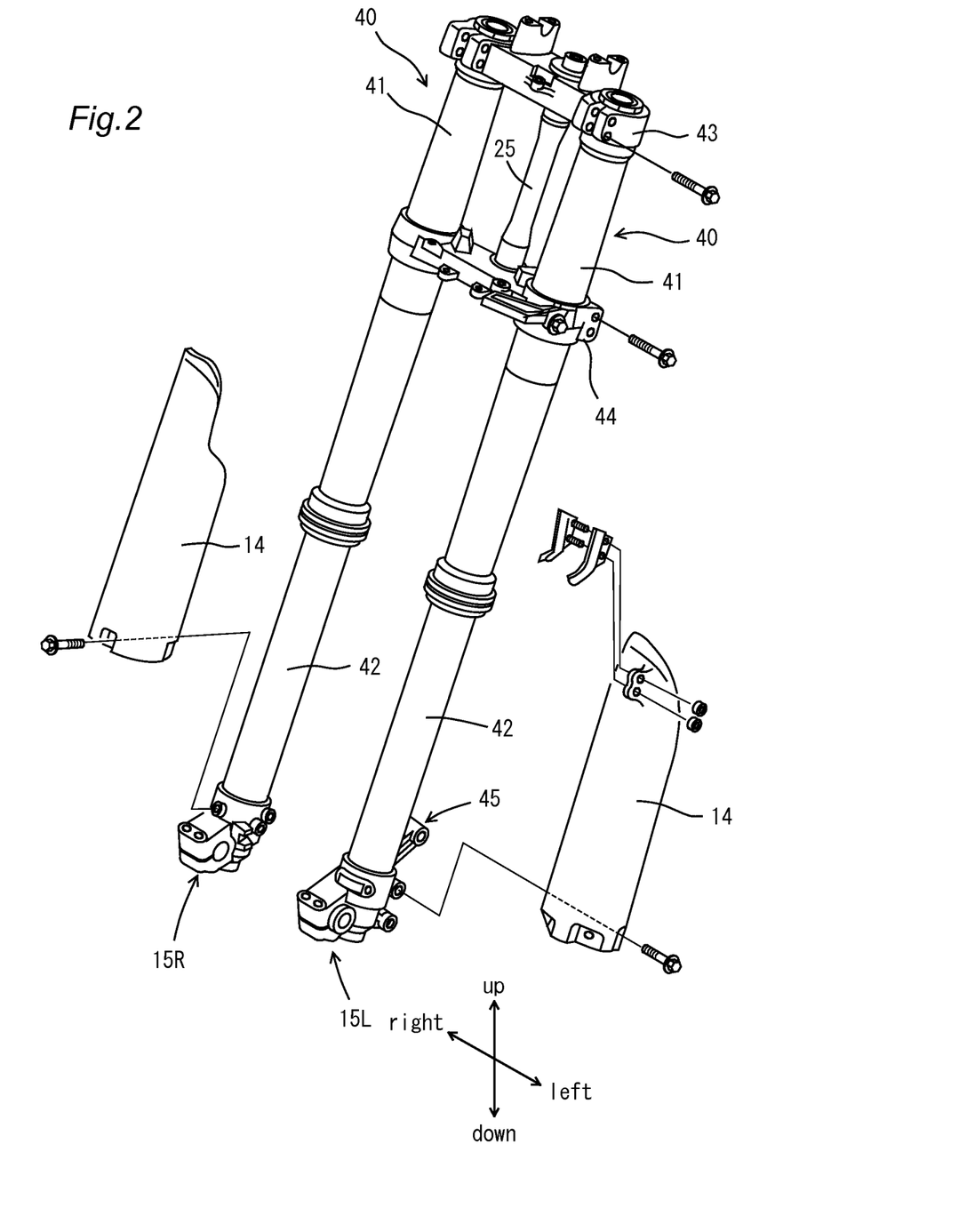
FIG. 2 is an oblique view of the exterior of a front fork.

FIG. 2 is an oblique view of the exterior of the front fork 40 in FIG. 1. The front fork 40 includes outer tubes 41 (outer tube members) and inner tubes 42 (inner tube members).

The outer tubes 41 are disposed at the upper portion of the front fork 40. The outer tubes 41 are preferably cylindrical in shape. The outer tubes 41 are disposed to flank the steering shaft 25 on the left and right. That is, the steering shaft 25 is disposed so as to be sandwiched between the two outer tubes 41. Although not depicted in the drawings, the steering shaft 25 is disposed rotatably within the head pipe 23.

The pair of outer tubes 41 and the steering shaft 25 are attached to an upper bracket 43 and an under bracket 44. That is, the upper end portions of the pair of outer tubes 41 and the steering shaft 25 are attached to the upper bracket 43. The middle portions of the pair of outer tubes 41 and the lower end portion of the steering shaft 25 are attached to the under bracket 44.

Of the pair of axle brackets 15L and 15R, the axle bracket 15L attached to the left inner tube 42 includes a brake seat 45 at its rear end. The above-mentioned brake caliper 16a is attached to the brake seat 45. The axle bracket 15R attached to the right inner tube 42 is not provided with a brake seat 45. This is because, as mentioned above, the brake apparatus 16 is disposed only on the left side of the front wheel 6.

The inner tubes 42 are disposed at the lower portion of the front fork 40. The inner tubes 42 are preferably cylindrical in shape. The outside diameter of the inner tubes 42 is smaller than the inside diameter of the corresponding outer tubes 41. The upper portions of the inner tubes 42 are inserted into the outer tubes 41 from the lower ends of the outer tubes 41.

Figure 3:
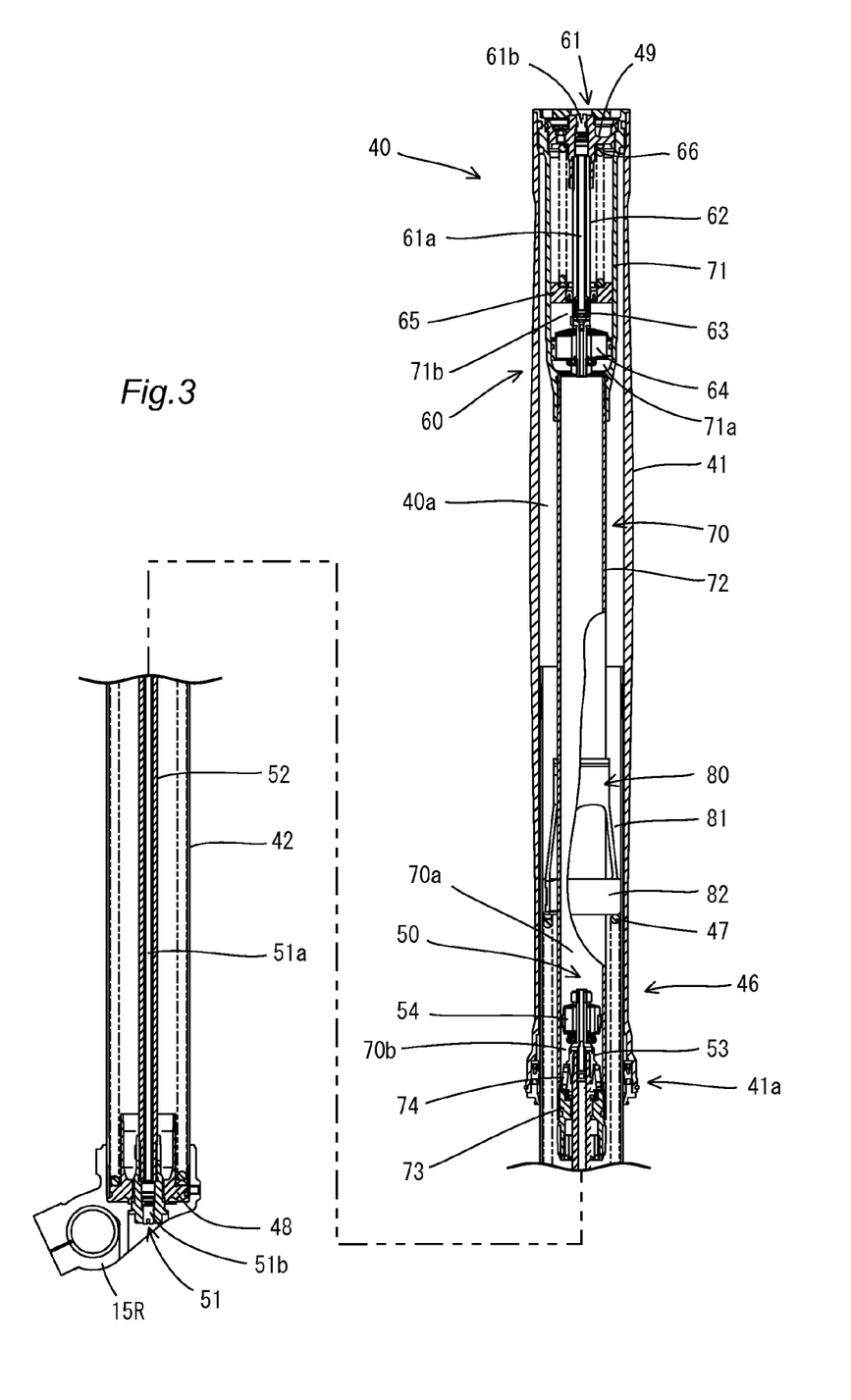
FIG. 3 is a cross-section of the front fork in its extended state.

FIG. 3 is a cross-section of the internal structure of the front fork 40. The front fork 40 includes dampers 46 and coil springs 47 (spring members) in addition to the above-mentioned outer tubes 41 and inner tubes 42. Each damper 46 and each coil spring 47 are disposed inside an internal space 40a defined by an outer tube 41 and an inner tube 42. As shown in FIG. 3, one end of the inner tube 42 is positioned within the outer tube 41, and the other end is covered by an inner tube cover 48 including a damper adjustment mechanism 51. The end of the outer tube 41 on the opposite side from the inner tube 42 is covered by an outer tube cover 49 including a damper adjustment mechanism 61. A seal 41a is provided at the end of the outer tube 41 on the inner tube 42 side, between the outer tube 41 and the inner tube 42. This structure defines the sealed internal space 40a in the interior of the outer tube 41 and the inner tube 42.

The coil spring 47 is disposed within the inner tube 42 so as to be able to expand and contract in the axial direction of the inner tube 42. One end of the coil spring 47 is in contact with the inner tube cover 48 that block off the end of the inner tube 42. The other end of the coil spring 47 is in contact with a spring guide 80 (discussed in detail below). The spring guide 80 is attached to the outer peripheral surface of a damper cylinder 70 (discussed below). The damper cylinder 70 includes a base housing component 71 (discussed below) that is fixed to the outer tube cover 49. Thus, the coil spring 47 is sandwiched between the outer tube 41 and the inner tube 42.

Consequently, the coil spring 47 expands and contracts according to displacement of the outer tube 41 and the inner tube 42.

The internal space 40a defined by the outer tube 41 and the inner tube 42 is a sealed space as discussed above, and therefore the upper portion of the internal space 40a constitutes the gas chamber of gas spring. A certain amount of oil is put into the internal space 40a defined by the outer tube 41 and the inner tube 42.

With the above configuration, the front fork 40 is such that the coil spring 47 and the internal space 40a defined by the outer tube 41 and the inner tube 42 absorb impacts that the front wheel 6 receives from the road.

The damper 46 includes a piston 50, a base component 60, and a damper cylinder 70. With the damper 46, a damping force is produced when the oil filling the damper cylinder 70 flows into the piston 50 and the base component 60. This suppresses the expansion and contraction vibration of the outer tube 41 and inner tube 42 produced when an impact force is absorbed by the coil spring 47 and the internal space 40a.

The damper cylinder 70 is preferably a cylindrical member disposed within the outer tube 41, and one end is connected to the outer tube cover 49. The damper cylinder 70 includes a base housing component 71 and a cylinder 72. The base housing component 71 and the cylinder 72 are connected to each other so as to extend in the axial direction of the damper cylinder 70. The base housing component 71 has inside and outside diameters that are larger than those of the cylinder 72, and is connected to the outer tube cover 49. The base component 60 is housed inside the base housing component 71.

The piston 50 is housed inside the cylinder 72, and the piston 50 moves in the interior of the cylinder 72. The opening of the cylinder 72 is covered by a rod guide 73. Through-hole through which a piston rod 52 (discussed below) passes is provided in the rod guide 73. The rod guide 73 is attached to the inner peripheral surface of the cylinder 72 so as to seal off the internal space of the cylinder 72, and provides the function of sealing between the cylinder 72 and the piston rod 52. A spring member 74 that prevents contact with a piston support 53 (discussed below) is provided on the inside of the cylinder 72 (see FIG. 4).

As shown in FIG. 3, the base component 60 includes a guide pipe 62, a sub-piston support 63, and a sub-piston 64. The guide pipe 62 is preferably a cylindrical member. The guide pipe 62 is connected at one end to the outer tube cover 49, and is connected at the other end to the sub-piston support 63. The sub-piston support 63 is also preferably a cylindrical member, and is connected at one end to the guide pipe 62, and threads are provided around the outer peripheral surface at the other end. The sub-piston 64 is fixed to the sub-piston support 63 preferably by nut attached to the threads provided at the end of the sub-piston support 63, in a state in which the above-mentioned other end of the sub-piston support 63 has been inserted.

The internal space of the base housing component 71 of the damper cylinder 70 is divided into two spaces by the sub-piston 64. More specifically, the internal space of the base housing component 71 is divided by the sub-piston 64 into a space 71a on the cylinder 72 side and a space 71b on the outer tube cover 49 side.

Although not particularly depicted, the sub-piston 64 includes an expansion-side port into which oil flows only when the front fork 40 is in its expanded state, and a compression-side port into which oil flows only when the front fork 40 is in its compressed state. The compression-side port and the expansion-side port link the space 71a on the cylinder 72 side with the space 71b on the outer tube cover 49 side. Also, the compression-side port and the expansion-side port produce a damping force by resisting the flow of oil when oil flows into their interior.

The compression-side port is provided with a compression-side valve so that oil will flow in only when the front fork 40 is in its compressed state. The expansion-side port is provided with an expansion-side valve so that oil will flow in only when the front fork 40 is in its expanded state. Consequently, a damping force is produced when oil flows into the compression-side port of the sub-piston 64 while the front fork 40 is in its compressed state. Meanwhile, a damping force is produced when oil flows into the expansion-side port of the sub-piston 64 while the front fork 40 is in its expanded state.

An adjusting rod 61a of the damper adjustment mechanism 61 provided on the outer tube cover 49 is disposed in the interior of the guide pipe 62. The adjusting rod 61a moves back and forth inside the guide pipe 62 by rotating an adjustment screw 61b located on the outer tube cover 49. Consequently, the distal end portion of the adjusting rod 61a varies the cross-sectional area of bypass path provided inside the sub-piston support 63. Therefore, the amount of oil flowing to the compression-side port and expansion-side port of the sub-piston 64 is adjusted by the damper adjustment mechanism 61.

The base component 60 further includes a movable piston 65 and a coil spring 66. The movable piston 65 is disposed more on the outer tube cover 49 side than the sub-piston 64 inside the base housing component 71 of the damper cylinder 70. The movable piston 65 is disposed so as to define a space between itself and the sub-piston 64. Oil that has passed through the compression-side port of the sub-piston 64 flows into the space. Also, the movable piston 65 has through-hole through which the guide pipe 62 passes. Consequently, the movable piston 65 moves within the base housing component 71 independently of the sub-piston 64.

The coil spring 66 is disposed between the movable piston 65 and the outer tube cover 49. The coil spring 66 is compressed when the movable piston 65 moves to the outer tube cover 49 side in the base housing component 71. That is, the coil spring 66 biases the movable piston 65 to the sub-piston 64 side with an elastic recovery force.

Although not particularly depicted, the base component 60 has a discharge function of discharging excess oil that has pooled in the space between the sub-piston 64 and the movable piston 65. This discharge function operates when oil drawn in from outside the base component 60 pools between the sub-piston 64 and the movable piston 65, and the movable piston 65 moves to the outer tube cover 49 side. Providing a discharge function such as this to the base component 60 suppresses or prevents the elevation in pressure within the base housing component 71 that is caused by the pooling of excess oil inside the base housing component 71 of the damper cylinder 70.

The oil discharged by this discharge mechanism from the base component 60 flows through the outer tube 41 to the inner tube 42 side. As will be discussed below, the oil passes through the spring guide 80 and collects on the inner tube cover 48 side of the inner tube 42.

The piston 50 includes a piston rod 52, a piston support 53, and a piston main body 54. The piston 50 is disposed so as to be opposite to the base component 60 inside the internal space 40a defined by the outer tube 41 and the inner tube 42.

The piston rod 52 is preferably a cylindrical member. The piston rod 52 is connected at one end to the inner tube cover 48, and is connected at the other end to the piston support 53.

The piston support 53 is also preferably a cylindrical member, and is connected at one end to the piston rod 52, and threads are provided around the outer peripheral surface at the other end. The piston main body 54 is fixed to the piston support 53 by nut attached to the threads provided at the end of the piston support 53, in a state in which the above-mentioned the other end of the piston support 53 has been inserted. This fixes the piston 50 to the inner tube 42.

The piston main body 54 of the piston 50 divides the internal space of the cylinder 72 of the damper cylinder 70 into two spaces. More specifically, the space inside the damper cylinder 70 is divided by the piston main body 54 into a space 70a on the base component 60 side and a space 70b on the rod guide 73 side.

Although not particularly depicted, the piston main body 54, just like the sub-piston 64, preferably includes an expansion-side port into which oil flows only when the front fork 40 is in its expanded state, and a compression-side port into which oil flows only when the front fork 40 is in its compressed state. The compression-side port and the expansion-side port link the space 70a on the base component 60 side with the space 70b on the rod guide 73 side. Also, the compression-side port and the expansion-side port produce a damping force by resisting the flow of oil when oil flows into their interior.

The compression-side port is provided with a compression-side valve so that oil will flow in only when the front fork 40 is in its compressed state. The expansion-side port is provided with an expansion-side valve so that oil will flow in only when the front fork 40 is in its expanded state. Consequently, a damping force is produced when oil flows into the compression-side port of the piston main body 54 while the front fork 40 is in its compressed state. Meanwhile, a damping force is produced when oil flows into the expansion-side port of the piston main body 54 while the front fork 40 is in its expanded state.

An adjusting rod 51a of the damper adjustment mechanism 51 provided at the inner tube cover 48 is disposed in the interior of the piston rod 52. The adjusting rod 51a moves back and forth inside the piston rod 52 by rotating an adjustment screw 51b located on the inner tube cover 48. Consequently, the distal end portion of the adjusting rod 51a varies the cross-sectional area of bypass path provided inside the piston support 53. Therefore, the amount of oil flowing to the compression-side port and expansion-side port of the piston 50 is adjusted by the damper adjustment mechanism 51.

With the above configuration, the front fork 40 produces a damping force as follows on the expansion and contraction vibration of the outer tube 41 and the inner tube 42 that occurs during the absorption of an impact force.

Figure 4:
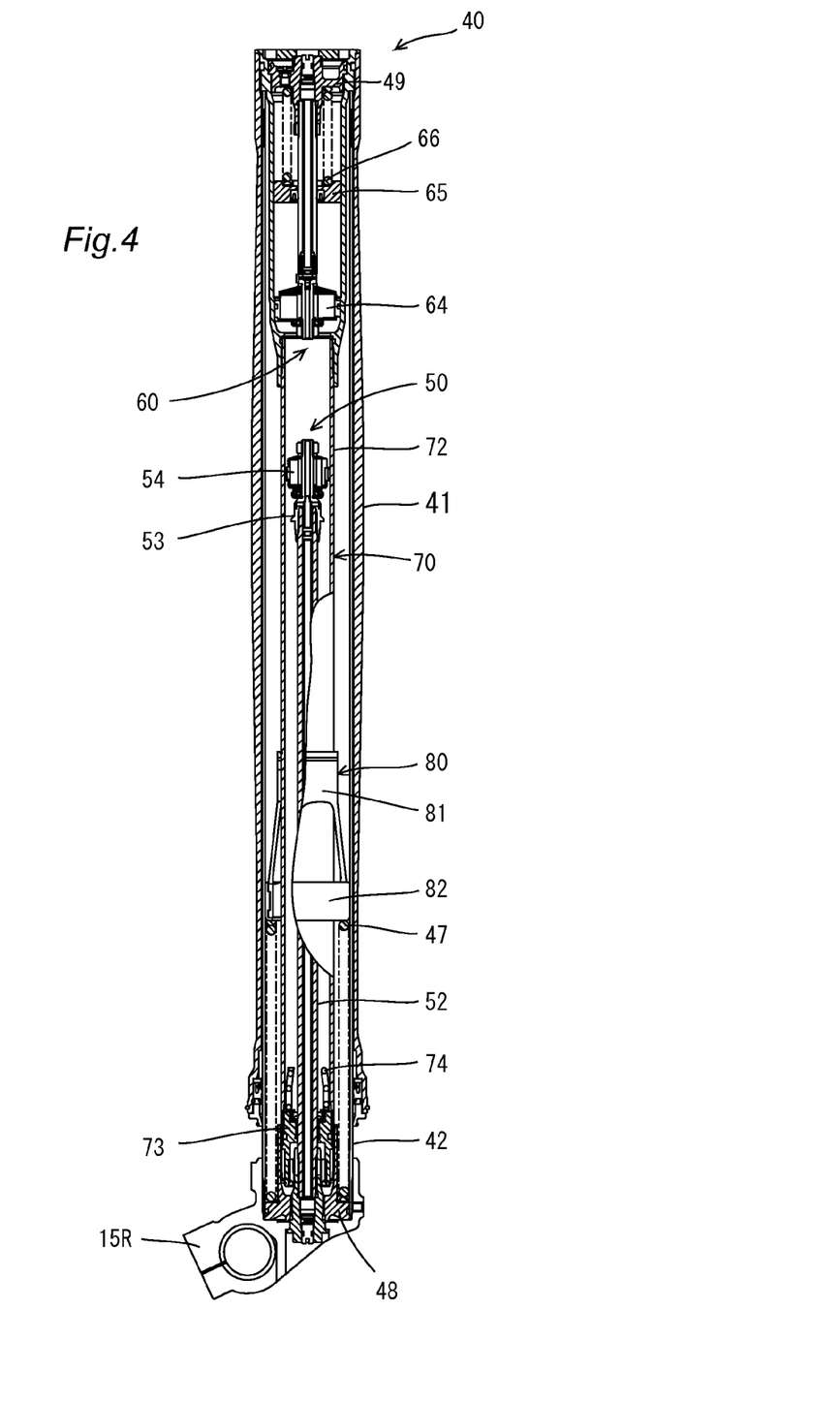
FIG. 4 is a cross-section of the front fork in its compressed state.

As shown in FIG. 4, when the front fork 40 is compressed, the inner tube 42 moves into the outer tube 41. Therefore, the piston 50 fixed to the inner tube 42 moves relatively through the damper cylinder 70 fixed to the outer tube 41 so as to approach the base component 60. At this point, a damping force is produced by the oil flowing through the compression-side port in the piston main body 54 of the piston 50, and a damping force is also produced by the oil flowing through the compression-side port in the sub-piston 64 of the base component 60.

As shown in FIG. 3, when the front fork 40 is expanded, the inner tube 42 is pulled out of the outer tube 41. Therefore, the piston 50 fixed to the inner tube 42 moves through the damper cylinder 70 fixed to the outer tube 41 so as to move away from the base component 60. At this point, a damping force is produced by the oil flowing through the expansion-side port in the piston main body 54 of the piston 50, and a damping force is also produced by the oil flowing through the expansion-side port in the sub-piston 64 of the base component 60.

Figure 5:
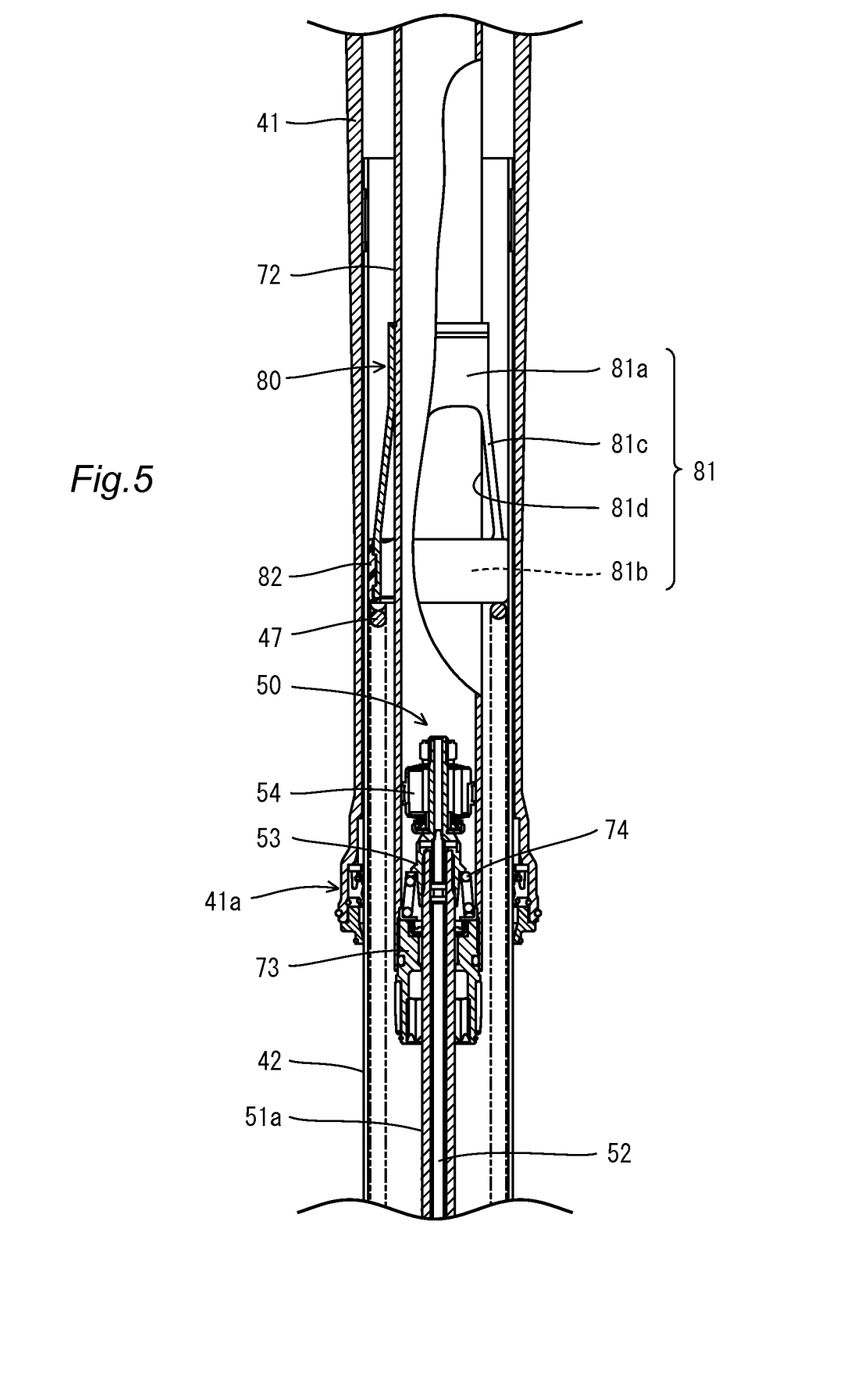
FIG. 5 is a detailed cross-section of the configuration around a spring guide in the front fork.
Figure 6:
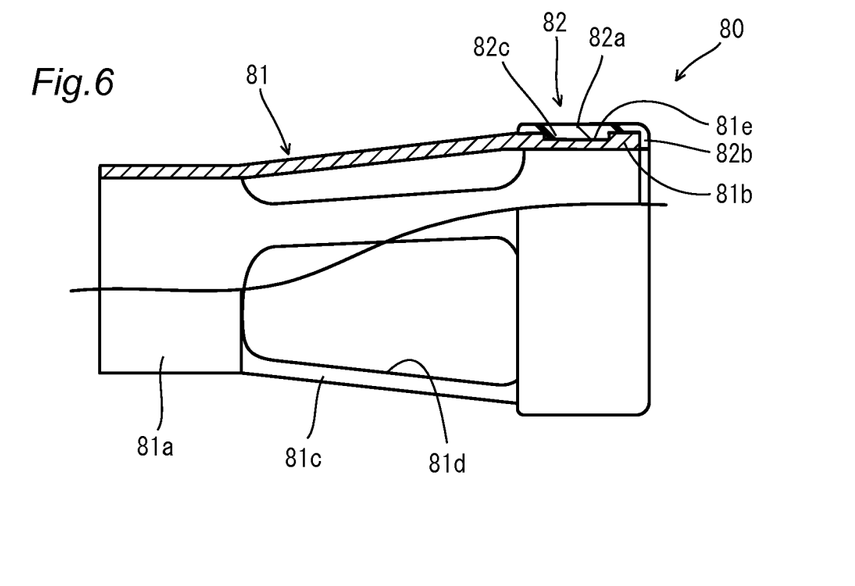
FIG. 6 is a partial cross-section of the simplified configuration of a spring guide.

Next, the configuration of the spring guide 80 (guide member) attached to the outer peripheral surface of the cylinder 72 of the damper cylinder 70 will be described with reference to FIGS. 5 and 6. FIG. 5 is a detailed cross-section of the configuration around a spring guide 80 in the front fork 40. FIG. 6 is a partial cross-section of the configuration of a portion of the spring guide 80.

The spring guide 80 includes a cylindrical guide main body 81 composed of a metal material, for example, and a low-friction component 82 that is attached to the outer peripheral surface of the guide main body 81. The guide main body 81 is attached at one end to the outer peripheral surface of the cylinder 72. The other end of the guide main body 81 has larger inside and outside diameters than the one end, so that the outer peripheral surface will be located near the inner peripheral surface of the inner tube 42. The other end of the guide main body 81 functions as a support member to support the end of the coil spring 47. Specifically, the guide main body 81 includes a cylindrical fixed component 81a that is attached to the outer peripheral surface of the cylinder 72, a cylindrical spring support 81b (tubular component) whose inside and outside diameters are larger than those of the fixed component 81a, and a connector 81c that links the fixed component 81a and the spring support 81b.

The connector 81c includes a plurality of openings 81d. Because the openings 81d are provided in the connector 81c, oil and air are allowed to move between the space on the outer tube cover 49 side and the space on the inner tube cover 48 side in the internal space 40a of the front fork 40. The internal space 40a of the front fork 40 is divided by the spring guide 80 into the base component 60 side and the piston 50 side. Providing the openings 81d in the connector 81c of the spring guide 80 allows oil and air to flow between these divided spaces. This allows oil discharged from the base component 60 to accumulate on the lower side (the inner tube cover 48 side) of the internal space 40a of the front fork 40.

The spring support 81b is disposed concentrically with the inner tube 42 so that its outer peripheral surface will conform to the inner peripheral surface of the inner tube 42. Specifically, the outer peripheral surface of the spring support 81b is arranged concentrically with the inner peripheral surface of the inner tube 42 when viewed in a cross-section perpendicular to the tube axis of the spring support 81b. An attachment groove 81e is provided in the outer peripheral surface of the spring support 81b, in the center portion of the axial direction, and all the way around the spring support 81b (see FIG. 6).

The low-friction component 82 is preferably made of a resin material having oil resistance, such as polyacetal or polybutylene terephthalate. Thus, the surface of the low-friction component 82 has a lower coefficient of friction than the metal guide main body 81. The low-friction component 82 preferably has a cylindrical shape so as to cover the outer peripheral surface of the cylindrical spring support 81b. More precisely, the low-friction component 82 preferably has a cylindrical side surface component 82a located on the outer peripheral surface of the spring support 81b, and an end surface component 82b that extends inward in the radial direction at one end of the side surface component 82a so as to cover the end of the spring support 81b. Consequently, the outer peripheral surface of the spring support 81b and the end on the open end side are covered by the low-friction component 82. Also, the low-friction component 82 is provided at the end of the cylindrical guide main body 81 on the opposite side from the fixed component 81a in the axial direction.

The low-friction component 82 is provided at a portion of the surface of the spring guide 80 that comes into contact with the inner tube 42 when the outer tube 41 and/or the inner tube 42 are bent. Consequently, even if the outer tube 41 and/or the inner tube 42 are bent and the spring guide 80 comes into contact with the inner surface of the inner tube 42, the operation of the front fork 40 will not be impaired.

A protrusion 82c (attachment component) attached to the attachment groove 81e in the outer peripheral surface of the spring support 81b is provided on the inner peripheral surface of the side surface component 82a of the low-friction component 82. When the protrusion 82c of the low-friction component 82 is attached to the attachment groove 81e of the spring support 81b, this prevents the low-friction component 82 from easily coming loose from the spring support 81b.

A gap between the side surface component 82a of the low-friction component 82 and the inner peripheral surface of the inner tube 42 is provided in a state in which no bending moment is being exerted on the front fork 40 (in a state in which neither the outer tube 41 nor the inner tube 42 is bending). The gap also allows oil to flow between the space on the outer tube cover 49 side and the space on the inner tube cover 48 side in the internal space 40a of the front fork 40.

The end of the coil spring 47 comes into contact with the end surface component 82b covering the end of the spring support 81b. Bringing the end of the coil spring 47 into contact with the plastic end surface component 82b prevents the spring support 81b of the spring guide 80 from being damaged by the end of the coil spring 47. Specifically, when the end of the coil spring 47 comes into direct contact with the metal spring guide, abrasion dust is produced from the spring guide by rubbing against the end of the coil spring 47. In contrast, abrasion dust produced by rubbing against the end of the coil spring 47 is prevented by covering the end of the spring support 81b of the spring guide 80 with the plastic low-friction component 82, as discussed above. Also, the above configuration reduces the frictional force between the low-friction component 82 and the coil spring 47. Thus, when the outer tube 41 and the inner tube 42 of the front fork 40 slide, the spring guide 80 is less apt to be affected by the twisting moment that produces in the coil spring 47. Therefore, this prevents the operation of the front fork 40 from being impaired by the twisting moment that produces in the coil spring 47.

The end surface component 82b is such that the length it protrudes inward in the radial direction of the spring guide 80 is greater than the radius of the coil wire that makes up the coil spring 47. Consequently, the end of the coil spring 47 is stably supported by the surface of the end surface component 82b.

In the present preferred embodiment, the plastic low-friction component 82 is provided on the outer peripheral surface of the spring support 81b of the spring guide 80. Consequently, when a bending moment is exerted on the front fork 40, the low-friction component 82 attached to the spring support 81b of the spring guide 80 comes into contact with the inner surface of the inner tube 42. This prevents an increase in the coefficient of friction at the contact portion between the spring guide 80 and the inner surface of the inner tube 42. Therefore, even when the front fork 40 is subjected to a bending moment, the front fork 40 can still operate smoothly.

In the present preferred embodiment, the low-friction component 82 is also provided at the portion of the spring guide 80 that comes into contact with the end of the coil spring 47. This prevents the spring support 81b of the spring guide 80 from being damaged by the end of the coil spring 47. Also, since there is little friction between the low-friction component 82 and the coil spring 47, when the outer tube 41 and the inner tube 42 of the front fork 40 slide they are less apt to be affected by the twisting moment that produces in the coil spring 47. Therefore, this prevents the operation of the front fork 40 from being impaired by the twisting moment of the coil spring 47.

In the present preferred embodiment, the protrusion 82c on the inner peripheral surface of the side surface component 82a of the low-friction component 82 is attached to the attachment groove 81e in the outer peripheral surface of the spring support 81b. This prevents the low-friction component 82 from easily coming loose from the spring support 81b.

In the present preferred embodiment, in a state in which no bending moment is being exerted on the front fork 40, there is a gap between the inner surface of the inner tube 42 and the low-friction component 82 attached to the spring support 81b of the spring guide 80. Consequently, oil discharged from the base component 60 into the outer tube 41 goes through not only the openings 81d provided in the spring guide 80, but also the gap, and collects inside the inner tube 42. Specifically, the spring guide 80 prevents the flow of oil in the front fork 40 from being impaired.

Modified Example of Preferred Embodiment 1

Figure 7:
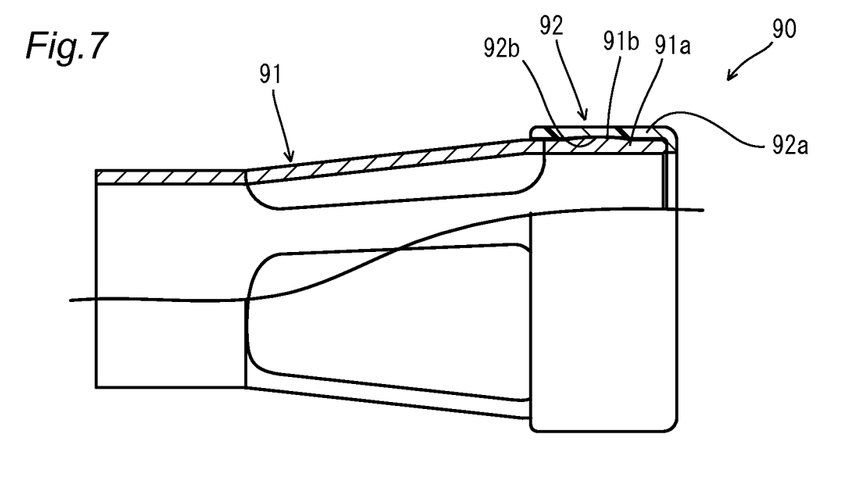
FIG. 7 is a partial cross-section of the simplified configuration of the spring guide of the front fork pertaining to a modified example of Preferred Embodiment 1 of the present invention.

FIG. 7 is a partial cross-section of the configuration of the spring guide 90 (guide member) according to a modified example of Preferred Embodiment 1. With the spring guide 90, the attachment structure of a low-friction component 92 and the outer peripheral surface of a spring support 91a (tubular component) of a guide main body 91 is different from the structure in Preferred Embodiment 1.

More specifically, a protrusion 91b that protrudes all the way around the spring support 91a is provided in the center portion in the tube axial direction on the outer peripheral surface of the spring support 91a in the guide main body 91 of the spring guide 90. A concave component 92b (attachment component) corresponding to the protrusion 91b is provided in the inner peripheral surface of side surface component 92a of the low-friction component 92.

Consequently, when the low-friction component 92 is attached to the spring support 91a of the guide main body 91, the protrusion 91b of the spring support 91a will be positioned within the concave component 92b of the low-friction component 92. This makes it less likely that the low-friction component 92 will separate from the guide main body 91. Furthermore, with the attachment structure in this modified example, since the low-friction component 92 moves flexibly according to the bending of the front fork when the front fork is bent, the operation of the front fork is less apt to be impaired.

Preferred Embodiment 2

Figure 8:
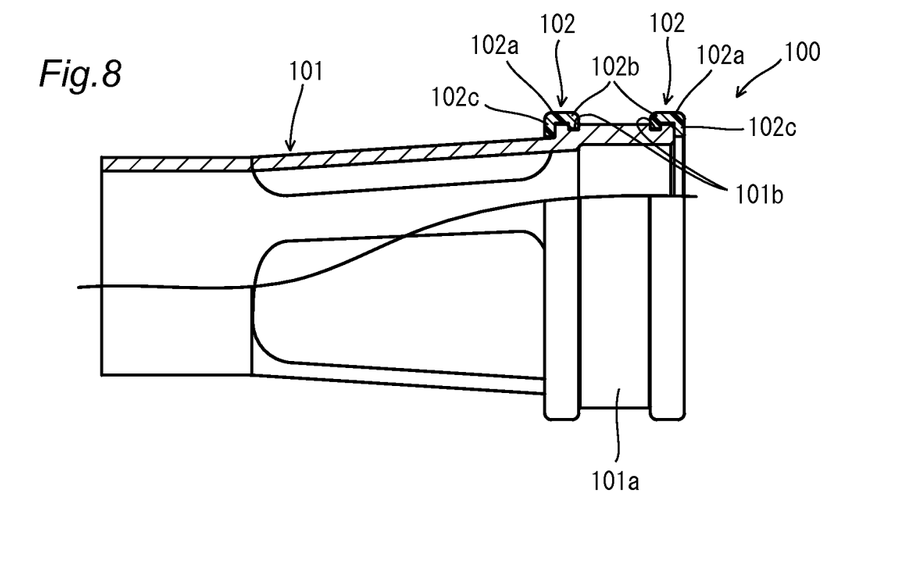
FIG. 8 is a partial cross-section of the simplified configuration of the spring guide of the front fork pertaining to Preferred Embodiment 2 of the present invention.

FIG. 8 shows a spring guide 100 (guide member) used in the front fork of a motorcycle according to Preferred Embodiment 2. The configuration in Preferred Embodiment 2 differs from that in Preferred Embodiment 1 in terms of the configuration of low-friction components 102 attached to a guide main body 101. Only those portions that are different from the configuration in Preferred Embodiment 1 will be described below, and portions that are the same as in Preferred Embodiment 1 will not be described again.

As shown in FIG. 8, two attachment grooves 101b are provided all the way around a spring support 101a (tubular component) on the outer peripheral surface of the spring support 101a of the guide main body 101 of the spring guide 100. These attachment grooves 101b are provided at both ends of the cylindrical spring support 101a in the axial direction.

The low-friction components 102 preferably have an annular shape with a hook-shaped cross-section, and are disposed at the both ends of the spring support 101a in the axial direction. More precisely, the low-friction components 102 include cylindrical side surface components 102a, protrusions 102b that extend inward in the radial direction at one end of the side surface components 102a in the axial direction, and end surface components 102c that extend inward in the radial direction at the other end of the side surface components 102a in the axial direction. The protrusions 102b are inserted into the attachment grooves 101b in the outer peripheral surfaces of the spring support 101a of the guide main body 101. The end surface components 102c are positioned on the end in the tube axial direction of the spring support 101a of the guide main body 101. Consequently, the low-friction components 102 are fixed to the spring support 101a of the guide main body 101 by the protrusions 102b and the end surface components 102c. Therefore, the low-friction components 102 are less likely to come loose from the spring support 101a of the guide main body 101.

With the above configuration, of the spring support 101a of the guide main body 101, the ends in the axial direction are covered by the low-friction components 102, but the center portion in the tube axial direction is exposed.

In the present preferred embodiment, the low-friction components 102 are provided only to the ends of the spring support 101a of the spring guide 100 in the axial direction, which are more apt to come into contact with the inner surface of the inner tube 42. Consequently, the surface areas of the low-friction components are smaller than when the low-friction components are provided over the entire outer peripheral surface of the spring support 101a, and this reduces the manufacturing cost.

Preferred Embodiment 3

Figure 9:
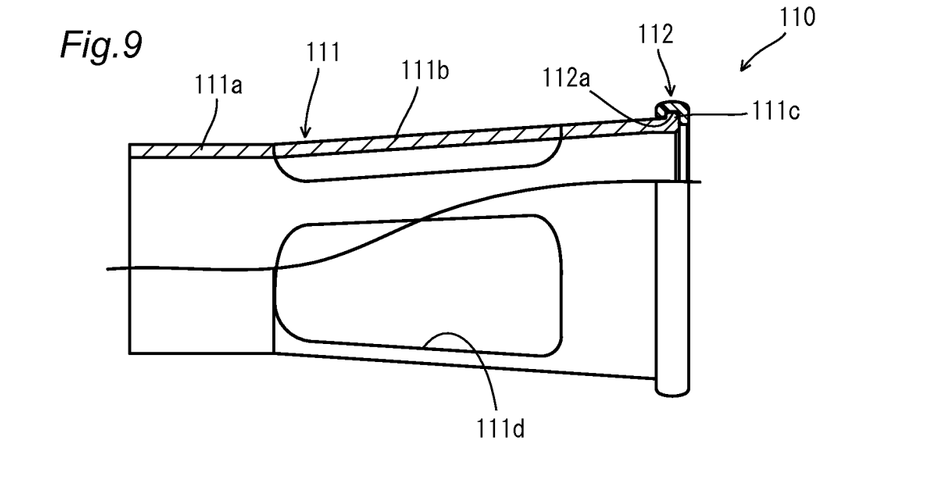
FIG. 9 is a partial cross-section of the simplified configuration of the spring guide of the front fork pertaining to Preferred Embodiment 3 of the present invention.

FIG. 9 shows a spring guide 110 (guide member) used in the motorcycle front fork according to Preferred Embodiment 3. The configuration in Preferred Embodiment 3 is different from that in Preferred Embodiment 1 in terms of the configuration of a guide main body 111 and a low-friction component 112. Only those portions that are different from the configuration in Preferred Embodiment 1 will be described below, and portions that are the same as in Preferred Embodiment 1 will not be described again.

As shown in FIG. 9, with the guide main body 111, the spring support is not cylindrical as in Preferred Embodiment 1, but is located at the end of a portion having a truncated cone shape, as with the connector in Preferred Embodiment 1. Specifically, the guide main body 111 includes a fixed component 111a and a main body component 111b (tubular component). The main body component 111b preferably has a truncated cone shape that gradually increases in diameter from an end of the cylindrical fixed component 111a toward an end opposite from the fixed component 111a in the axial direction. A protrusion 111c that protrudes all the way around the main body component 111b is provided on the outer peripheral surface at the open end of the main body component 111b. In the present preferred embodiment, a plurality of openings 111d that allow oil and air to pass through are provided in the main body component 111b.

The low-friction component 112 preferably has an annular shape with a hook-shaped cross-section. A concave component 112a into which the protrusion 111c of the guide main body 111 is inserted is provided in the inner surface of the low-friction component 112. Consequently, the protrusion 111c of the guide main body 111 is sandwiched between the protrusions that constitute the concave component 112a of the low-friction component 112. Therefore, the low-friction component 112 is prevented from easily coming loose from the guide main body 111.

In the present preferred embodiment, the cylindrical spring support used in Preferred Embodiment 1 is not provided on the guide main body 111, and instead the main body component 111b is provided in the connector and the spring support that are integral. Consequently, there is only one place where the spring guide 110 comes into contact with the inner surface of the inner tube 42. Therefore, an increase in the coefficient of friction between the spring guide 110 and the inner tube 42 is effectively suppressed by attaching the low-friction component 112 at the place where the guide main body 111 comes into contact with the inner tube 42. Furthermore, since fewer low-friction components 112 are attached to the guide main body 111, the manufacturing cost is reduced.

Preferred Embodiment 4

Figure 10:
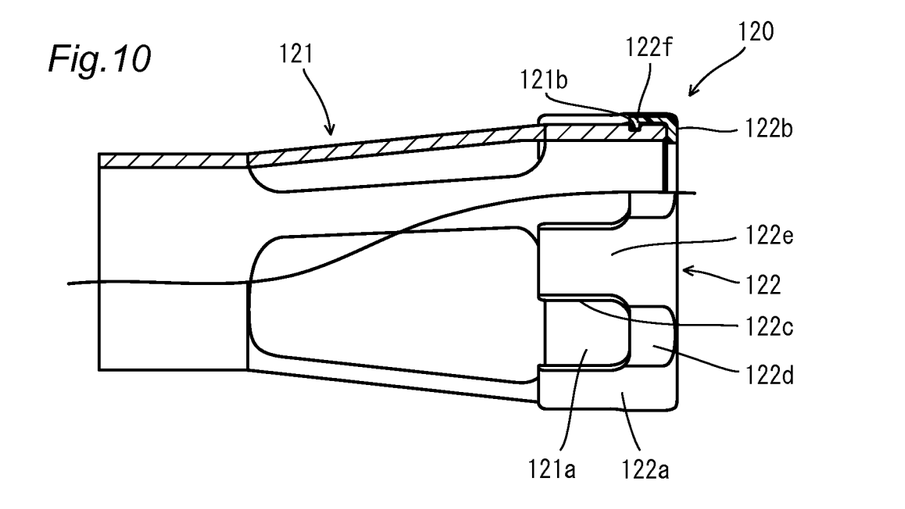
FIG. 10 is a partial cross-section of the simplified configuration of the spring guide of the front fork pertaining to Preferred Embodiment 4 of the present invention.

FIG. 10 shows a spring guide 120 (guide member) used in the motorcycle front fork according to Preferred Embodiment 4. The configuration in Preferred Embodiment 4 is different from that in Preferred Embodiment 1 in terms of the configuration of a low-friction component 122. Only those portions that are different from the configuration in Preferred Embodiment 1 will be described below, and portions that are the same as in Preferred Embodiment 1 will not be described again.

As shown in FIG. 10, an attachment groove 121b is provided all the way around a spring support 121a (tubular component) on the outer peripheral surface of the spring support 121a in a guide main body 121 of the spring guide 120.

The low-friction component 122 includes a cylindrical side surface component 122a that covers at least a portion of the spring support 121a of the guide main body 121, and an end surface component 122b that extends inward in the radial direction from the end of the side surface component 122a in the axial direction. Just as in Preferred Embodiment 1, the end surface component 122b covers the end on the open end side of the spring support 121a of the guide main body 121.

A plurality of cut-outs 122c that extend in the axial direction are provided at the end of the side surface component 122a of the low-friction component 122 on the opposite side from the end surface component 122b. These cut-outs 122c are arranged at an equidistant spacing in the peripheral direction of the side surface component 122a of the low-friction component 122. Consequently, the portion of the side surface component 122a of the low-friction component 122 where the cut-outs 122c are arranged exposes the spring support 121a of the guide main body 121. In other words, the portion of the side surface component 122a of the low-friction component 122 where the cut-outs 122c are not arranged becomes comb teeth 122e that cover the spring support 121a of the guide main body 121.

Recesses 122d are provided in the surface of the side surface component 122a of the low-friction component 122 at locations adjacent to the cut-outs 122c in the axial direction. Consequently, of the side surface component 122a of the low-friction component 122, only the comb teeth 122e come into contact with the inner surface of the inner tube 42.

Furthermore, a protrusion 122f (attachment component) that protrudes all the way around the inner peripheral surface of the side surface component 122a of the low-friction component 122 is provided in the side surface component 122a. The protrusion 122f is attached to the attachment groove 121b in the spring support 121a of the guide main body 121.

Figure 11:
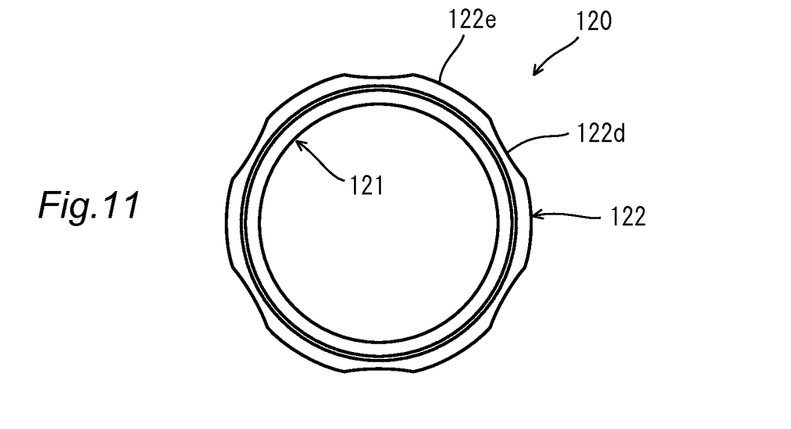
FIG. 11 is a diagram of the front fork pertaining to Preferred Embodiment 4 when viewed from the open end side on which the low-friction component is attached.

As shown in FIG. 11, when the low-friction component 122 is viewed in the axial direction, the cut-outs 122c and the recesses 122d constitute grooves in the outer peripheral surface of the low-friction component 122. The configuration here is not limited to providing the above-mentioned cut-outs and recesses, and may instead be one in which grooves extending in the axial direction are provided on the outer peripheral surface so as to define the comb teeth 122e.

In the present preferred embodiment, the comb teeth 122e are provided in the low-friction component 122 that covers the spring support 121a of the guide main body 121 of the spring guide 120. This allows the comb teeth 122d of the low-friction component 122 to come into contact with the inner peripheral surface of the inner tube 42. Therefore, an increase in the coefficient of friction when the spring guide 120 and the inner tube 42 come into contact is prevented.

Other Preferred Embodiments

Preferred embodiments of the present invention have been described above, but the above preferred embodiments are merely examples of the present invention. Thus, the present invention is not limited to or by the above preferred embodiments, and the above preferred embodiments can be suitably modified without departing from the gist thereof.

In the above preferred embodiments, the low-friction components 82, 92, 102, 112, and 122 of the spring guides 80, 90, 100, 110, and 120, respectively, are preferably made of a plastic material. However, the low-friction components 82, 92, 102, 112, and 122 may be made of any material, so long as it has a lower friction than the guide main bodies 81, 91, 101, 111, and 121. For example, the surface of the guide main bodies may be coated with a low-friction material.

In the above preferred embodiments, spring guides of the front fork 40 of the motorcycle 1 were described, but the configurations of the various preferred embodiments described above may be applied to the shock absorbers of other vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle shock absorber comprising:
an outer tube member connected to a vehicle body;
an inner tube member connected to a wheel and disposed on an inside of the outer tube member so as to be capable of relative movement in an axial direction of the outer tube member;
a damper cylinder connected to the outer tube member and disposed on an inside of the inner tube member;
a guide member fixed to a portion of an outer peripheral surface of the damper cylinder that is opposite to the inner tube member; and
a spring member disposed between the inner tube member and the guide member and arranged to expand and contract along with the relative movement of the outer tube member and the inner tube member; wherein
the guide member includes:
a guide main body; and
a low-friction component provided at a portion of the guide main body that comes into contact with the inner tube member when the outer tube member and/or the inner tube member is bent; wherein
the low-friction component has a coefficient of friction lower than a coefficient of friction of the guide main body; and
the low-friction component includes a gap between itself and the inner tube member in a state in which neither the outer tube member nor the inner tube member is bent.

2. The vehicle shock absorber according to claim 1, wherein the guide main body includes a tubular component that surrounds the outer peripheral surface of the damper cylinder; and
the low-friction component is provided at a portion of the tubular component that comes into contact with the inner tube member when the outer tube member and/or the inner tube member is bent.

3. The vehicle shock absorber according to claim 2, wherein the low-friction component is provided at an axial end of the tubular component.

4. The vehicle shock absorber according to claim 2, wherein the low-friction component has a tubular shape that covers at least a portion of the tubular component, and an attachment component that attaches the low-friction component to the tubular component is provided at an inner peripheral surface of the low-friction component.

5. The vehicle shock absorber according to claim 1, wherein the low-friction component has a tubular shape, and a groove extending in the axial direction is provided at an outer peripheral surface of the low-friction component.

6. The vehicle shock absorber according to claim 1, wherein the low-friction component is provided at a portion of the guide main body that comes into contact with the spring member.

7. The vehicle shock absorber according to claim 1, wherein the low-friction component is made of a plastic material.

8. A vehicle shock absorber comprising:
an outer tube member connected to a vehicle body;
an inner tube member connected to a wheel and disposed on an inside of the outer tube member so as to be capable of relative movement in an axial direction of the outer tube member;
a damper cylinder connected to the outer tube member and disposed on an inside of the inner tube member;
a guide member fixed to a portion of an outer peripheral surface of the damper cylinder that is opposite to the inner tube member; and
a spring member disposed between the inner tube member and the guide member and arranged to expand and contract along with the relative movement of the outer tube member and the inner tube member; wherein
the guide member includes:
a tubular guide main body fixed at one end to the outer peripheral surface of the damper cylinder; and
a low-friction component provided at an end of the guide main body on an opposite side from the one end in the axial direction; wherein
the low-friction component has a coefficient of friction lower than a coefficient of friction of the guide main body; and
the low-friction component includes a gap between itself and the inner tube member in a state in which neither the outer tube member nor the inner tube member is bent.

* * * * *